United States Patent [19]

Staron

[11] Patent Number: 4,833,658

[45] Date of Patent: May 23, 1989

[54] METHOD OF SEISMIC PROSPECTING WITH VERY HIGH RESOLUTION IN HORIZONTAL BOREHOLES

[75] Inventor: Philippe Staron, Mennecy, France

[73] Assignee: Societe Nationale Elf Aquitaine (Production), Courbevoie, France

[21] Appl. No.: 49,558

[22] Filed: May 14, 1987

[30] Foreign Application Priority Data

May 16, 1986 [FR] France ................................ 86 07031

[51] Int. Cl.[4] .............................................. G01V 1/40
[52] U.S. Cl. ...................................... 367/27; 367/25; 181/101; 181/102
[58] Field of Search ....................... 367/25, 26, 27, 33, 367/36, 37, 56, 57; 181/101, 102, 104, 108, 111, 112

[56] References Cited

U.S. PATENT DOCUMENTS

| | | | |
|---|---|---|---|
| 4,122,431 | 10/1978 | Peraldi | 367/45 |
| 4,524,433 | 6/1985 | Broding | 367/27 |
| 4,592,030 | 5/1986 | Arditty et al. | 367/27 |
| 4,649,526 | 3/1987 | Winbow et al. | 367/27 |

FOREIGN PATENT DOCUMENTS

| | | |
|---|---|---|
| 0170582 | 2/1986 | European Pat. Off. . |
| 2431710 | 7/1978 | France . |
| 2514152 | 10/1981 | France . |

*Primary Examiner*—Thomas H. Tarcza
*Assistant Examiner*—Ian J. Lobo
*Attorney, Agent, or Firm*—Foley & Lardner, Schwartz, Jeffery, Schwaab, Mack, Blumenthal & Evans

[57] ABSTRACT

A method of seismic prospecting with very high resolution as applicable in particular to exploitation of a productive hydrocarbon deposit essentially consists in transmitting and receiving acoustic waves, in recording shot moments, in determining average propagation velocities of refracted and reflected waves and in establishing a depth-section in order to determine the positions of interfaces located within the geological zone traversed horizontally by a horizontal borehole.

10 Claims, 1 Drawing Sheet

METHOD OF SEISMIC PROSPECTING WITH VERY HIGH RESOLUTION IN HORIZONTAL BOREHOLES

BACKGROUND OF THE INVENTION

1. Field of the Invention

The present invention relates to a method of seismic prospecting with very high resolution in boreholes which are either horizontal or very highly inclined.

In the description which follows below, the expression "horizontal borehole" refers either to a borehole which is slightly inclined or not inclined at all with respect to the horizontal or else to a borehole which is highly inclined or deviated from a vertical wellbore.

2. Description of the Prior Art

It is an increasingly widespread practice to drill horizontal boreholes, especially in productive hydrocarbon deposits in order to drain the deposit to a distance which is considerably greater than its thickness whereas a vertical borehole drains the deposit only to a distance corresponding to its thickness. Within the deposit zone, a horizontal borehole cuts through geological strata at a small angle or even passes through the same stratum over an appreciable distance of the order of several hundred meters, the axis of said borehole being substantially parallel to the limits of said geological stratum.

The horizontal borehole drilled from a vertical well is usually of relatively substantial depth within the productive formation which is constituted by superposed strata separated by interfaces.

A study of the strata located above the horizontal borehole and therefore traversed by the vertical wellbore is very important in order to obtain information relating to lithologic properties (chemical compositions), sedimentologic properties and fracturing properties of rocks, fluid content and petrophysical parameters (porosity, permeability, compressibility, and so on).

A study of this type is carried out by means of the usual technique known as well-logging which may in particular be of the acoustic type. The acoustic values measured by means of an acoustic well-logging tool of the type described in French Pat. No. FR 2,431,710 (EVA ® Process) are essentially the velocities and attenuations of the compressional waves and shear waves which are representative of the rock traversed by the acoustic paths and of the Stoneley waves and pseudo-Rayleigh waves which are representative both of the rock traversed and of the geometry of the wellbore.

The measurement is made by transmitting an acoustic wave through the fluid which fills the vertical wellbore from one or a number of transmitting sources and by receiving at one or a number of receivers waves of various types produced by the transmitted wave. The waves arriving at the receiver or receivers are converted to electrical signals by the receiver or receivers (of the piezoelectric type, for example). The electrical signals are transmitted to the surface by an electric cable, then recorded preferably in digital form in a suitable recording instrument. The recorded signals are then processed by a computer in order to identify the arrivals corresponding to each type of wave, especially compressional waves and shear waves and in order to determine the properties of interest such as propagation velocities (or arrival times), amplitude, period. Various processing operations may be performed in order to improve the accuracy and quality of the measurements to be made. Among those which have been proposed, one suitable processing operation described in French Pat. No. 81 18 672 is worthy of mention.

A distinguishing property of all well-logging measurements lies in the fact that they are performed within the vertical wellbore and that they relate to a small portion of space surrounding said vertical wellbore. This applies to all well-logging systems, whether they are of the acoustic, electrical, nuclear or other types. In particular, in the case of acoustic logs, this is due to the fact that the paths of the acoustic waves are paths of the refracted type. In fact, the waves transmitted through the vertical wellbore fluid are refracted at the wall of the wellbore, follow the wall over a certain distance, are then again refracted and finally arrive at the receiver or receivers of the logging tool.

The waves which arrive at the receiver or receivers are therefore practically those which have followed a path along the wall of the vertical wellbore. In consequence, the measurements concern only a small lateral portion of material of the geological stratum located between the transmitter or transmitters and the receiver or receivers of the well-logging tool. By "lateral portion of material" is meant the thickness of material traversed by the transmitted acoustic wave and considered in a direction substantially perpendicular to the vertical axis of the wellbore. It is readily apparent that the measurements made relate primarily to the thickness of the geological stratum as considered vertically and therefore the vertical portion of stratum located between the transmitter or transmitters and the receiver or receivers.

Although the transmitted acoustic waves propagate over considerable distances throughout the medium which surrounds the vertical wellbore, it has in fact proved impossible to receive and record reflected waves except in rare cases due to heterogeneities such as faults, fractures or salt domes, for example.

Up to the present time, formation analysts were unable to gain direct access to data relating to geological strata located beneath the horizontal borehole. In order to permit access to these data, it was necessary to carry out a very approximate study based on geological survey-map assumptions, dynamic measurements (pressure-flow relations) within the horizontal borehole or between boreholes (interferences), seismic surface measurements. Unfortunately, surface measurements have low selectivity and are uncertain, in the first place by reason of the presence of a modified zone at the ground surface and in the second place by reason of the considerable distance which has to be traversed by the waves between the surface and very deep geological strata. Apart from the large amount of energy to be produced in order to permit propagation of waves to the deepest geological strata, it is to be noted in addition that the accuracy of measurements is relatively low for the reason that the frequency employed has to be fairly low. In practice, measurements are accurate to within an approximation of a few tens of meters.

Moreover, data relating to strata located beneath the horizontal borehole are very difficult if not actually impossible to obtain by reason of the fact that these strata are too remote from the borehole for a traditional well-log.

SUMMARY OF THE INVENTION

The object of the present invention is to propose a novel method of seismic prospecting which makes it possible to establish a veritable hole-bottom seismic record and offers numerous advantages for the formation analyst.

The method in accordance with the invention as utilized in a horizontal borehole essentially involves the following steps:

a measuring tool which is constituted by at least three transducers for transmitting and receiving acoustic waves and which has a length equal at a maximum to the distance between the borehole and the most distant interface of interest of a zone of the medium is placed within a horizontal borehole;

acoustic waves are generated by at least one of the transmitting transducers, the wavelength of said acoustic waves being within the range of a few centimeters to a few meters;

the receiving transducer or transducers receive on the one hand the waves refracted from the borehole wall and from the geological strata located in the immediate vicinity of said borehole and on the other hand the waves reflected from the geological strata located at a distance from said borehole;

said refracted waves and reflected waves are recorded in the form of electrical signals;

the instants of generation of the transmitted acoustic waves are recorded;

the recorded signals are processed in order to determine at least the average propagation velocities of the refracted waves and reflected waves respectively;

at least one time-section is determined from the signals corresponding to the reflected waves;

at least the time-section is converted to a depth-section by means of the average propagation velocities of the reflected waves so as to constitute a depth-section from which is determined the position of the interfaces located within the geological zone traversed horizontally by said borehole.

One advantage of the present invention lies in the fact that a zoom effect is really obtained in the reservoir portion of the deposit and describes with a high degree of accuracy the geometry and constitution of the reflectors both in thickness and in nature.

A further advantage of the method in accordance with the invention is that it permits determination of the position of the top and bottom limits of adjacent strata of the horizontal borehole.

Another very important advantage of the method in accordance with the invention lies in the possibility now offered of making an approach to the heterogeneities of the geological strata on a scale varying from a few centimeters to the length of the horizontal drain, namely of the order of a few hundred meters.

DETAILED DESCRIPTION OF THE INVENTION

Figure 1:
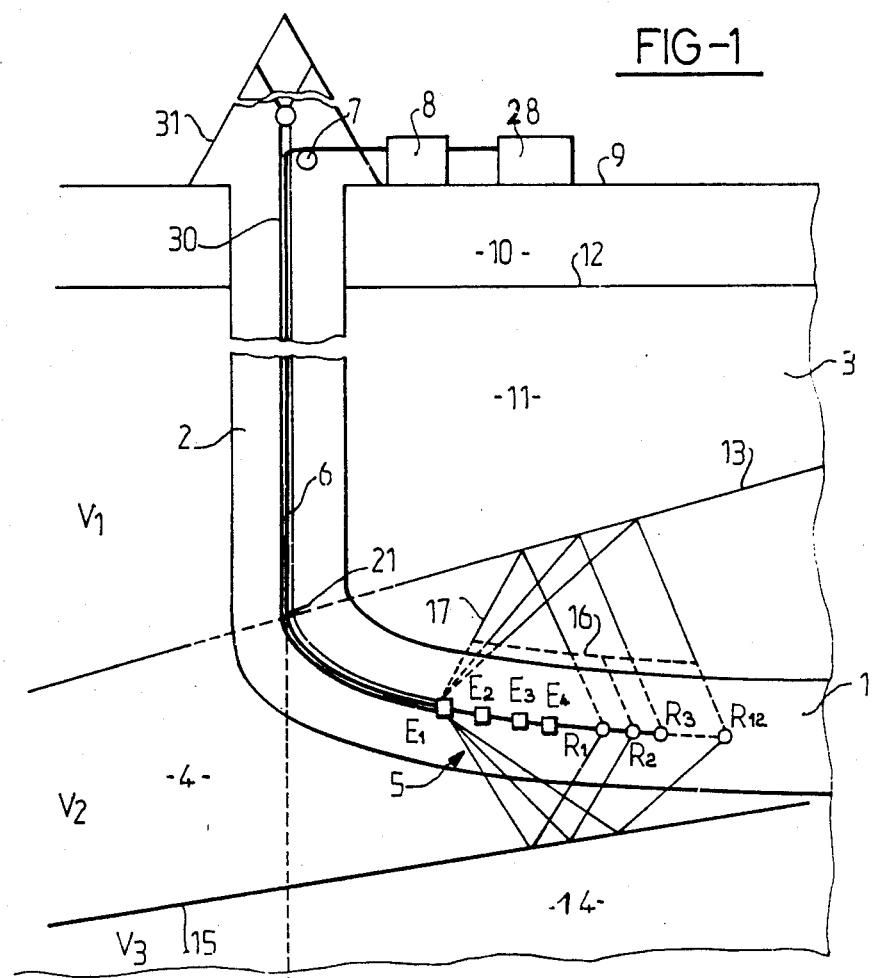
FIG. 1 is a fragmentary representation of a vertical wellbore and of a horizontal borehole.

The method in accordance with the invention is carried out within a horizontal borehole 1 having a small angle of slope with respect to a horizontal axis or a large angle of slope with respect to a vertical axis and generally deviated from a vertical wellbore 2 drilled in a medium 3 in which is located a zone 4 containing or capable of containing a hydrocarbon deposit.

A measuring tool generally designated by the reference numeral 5 and constituted by an array of transducers employed in some instances as transmitters and in other instances as receivers is run in the horizontal borehole 1. Preferably, the measuring tool 5 includes four transmitters $E_1$ to $E_4$ separated from each other by a constant interval equal for example to 0.25 m and twelve receivers $R_1$ to $R_{12}$ separated from each other by a constant interval equal for example to one meter. The interval between the last transmitter $E_4$ and the first receiver $R_1$ is one meter.

The measuring tool 5 is mounted at the end of a drill string 30 coupled by driving means of known type (not shown) to a drilling derrick 31 in order to be displaced within the vertical wellbore 2 and the horizontal borehole 1.

Stratified geological layers separated by interfaces are located between the horizontal borehole 1 and the surface 9 of the medium 3. For reasons of enhanced clarity, there are shown in the drawings only the strata 10 and 11 separated by the interfaces 12 and 13 whilst the zone 4 of the horizontal borehole 1 can also have a number of superposed geological strata. Beneath the zone 4, the medium 3 is represented by a single bottom geological stratum 14 separated from the zone 4 by an interface 15.

In accordance with the invention, the tool 5 has a total length which is at most equal to the distance between the horizontal borehole 1 and the most distant interface of interest such as the interface 13 or 15, for example.

When the tool 5 is pulled to the surface 9 from an end position on the right in FIG. 1, the transmitters $E_1$ to $E_4$ are excited one after the other or practically simultaneously so that each transmitter should accordingly emit an acoustic wave. The transmitters $E_1$ to $E_4$ are in particular piezoelectric or magnetostrictive transducers. The transmitted acoustic wave propagates within the zone 4 along two different types of paths before arriving at each receiver $R_1$ to $R_{12}$.

The first type of path 16 represented by a dashed line corresponds to refraction along the wall of the horizontal borehole 1 from the geological stratum located in the immediate vicinity of said horizontal borehole. The second type of path 17 represented by a full line corresponds to reflection of the emitted wave from the interface 13, for example.

For reasons of simplification, only a few refraction and reflection paths have been illustrated. Similarly, it has not appeared necessary to show the refraction along the horizontal borehole 1 on the side corresponding to reflection from the interface 15.

The refracted and reflected waves are picked-up by the receivers $R_1$ to $R_{12}$ of the piezoelectric type and converted to electrical signals. By means of a cable 6 housed within the drill string 30 and passed around a pulley 7, said electrical signals are transmitted to a recording unit represented diagrammatically by a block 8. The signals are preferably recorded in digital form for subsequent data-processing in a unit which is represented in the figure by a block 28.

The acoustic-wave transmissions (shots) succeed each other at uniform intervals which may or may not exceed the listening time, this being a function of the type of signal transmitted. By way of example, the wave transmissions succeed each other at intervals of 70 ms, which corresponds to a length of feed of the measuring tool 5 of the order of 8 mm, each instant of wave initiation or shot moment being recorded by the unit 8. Similarly, the wavelength of the transmitted acoustic waves is within the range of a few centimeters to a few meters and preferably within the range of 15 to 75 centimeters.

The electrical signals recorded in the form of traces are then processed so that the final result of the processing operation should produce on the one hand data relating to the refracted waves and on the other hand data relating to the reflected waves.

Figure 2:
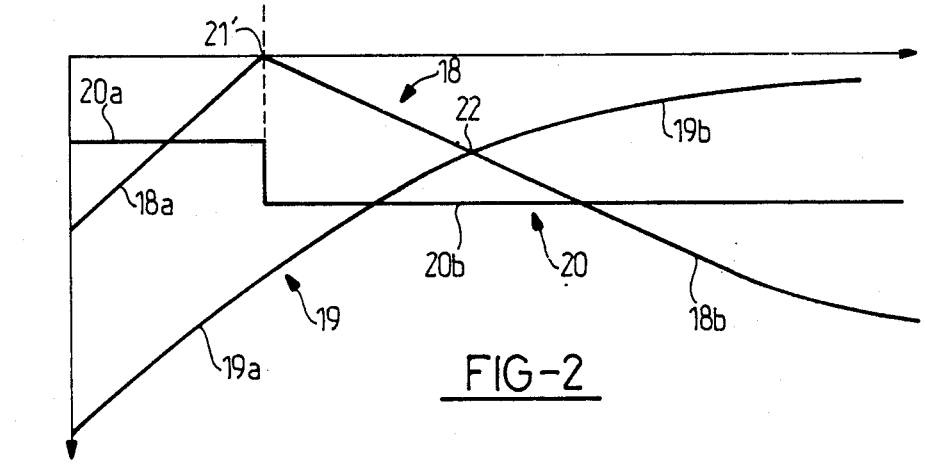
FIG. 2 is a time-section in which the times of arrival of a wave refracted from the horizontal borehole wall and of the waves reflected from interfaces surrounding said borehole are plotted as a function of the curvilinear abscissa of the horizontal borehole.

Since the shot moments have been recorded and the transmitter-receiver pair which has given rise to each trace is identified, it is possible by making use of the special processing operations described in French Pat. Nos. 2 514 152 and EP 0 170 582 and on the basis of the recorded traces to measure the compressional-wave, shear-wave and mud parameters as well as other parameters such as amplitude, attenuation, period and transit time (velocity) relating to the geological stratum which surrounds the horizontal borehole 1 and is located in the immediate vicinity of this latter, these data being necessary for achieving more effective exploitation of the formation. The subject matter of French Pat. No. 2 514 152 and French Pat. No. 0 170 582 is included in the present description. By means of the aforementioned processing operation, it is possible to determine the average propagation velocities of refracted waves within the stratum which surrounds the horizontal borehole. Curve 20 of FIG. 2 represents the arrival of a refracted compressional wave P from which it is possible to deduce the local propagation velocity along the horizontal borehole. The change of time and therefore of velocity which occurs between the upper portion 20a and the lower portion 20b of the curve 20 corresponds to traversal Within the horizontal borehole 1 from the zone 4 to the geological stratum 3 in which the wave propagation velocities are different and respectively equal to $V_2$ and $V_1$ with $V_2 < V_1$. Traversal of the interface 13 is represented schematically by the point 21.

The traces are processed so as to determine in addition the average velocities of the reflected waves as well as to establish an image-time section, after static and dynamic correction, which is similar to the section represented diagrammatically in FIG. 2 by the curves 18 and 19.

The image-time section obtained from the recorded traces is established in the following manner:
the recorded traces are grouped together as a function of the common mirror points which belong to different interfaces but are aligned on one and the same median line of the transmitter-receiver segment which has produced each trace of the group;
a series of different dynamic corrections are applied in respect of different velocities within two predetermined limits between which the average velocity of propagation within the medium should be located. In respect of each velocity, the sum of corrected traces relating to the line of common mirror points is formed, whereupon there is selected in respect of each instant the velocity which has produced at that instant the sum trace having the highest energy;
a law of velocity representing the average velocity of propagation within the medium is then constructed in respect of each group of traces having common mirror points;

a dynamic correction is made for each trace of one and the same group by utilizing the law of velocity determined in respect of said group;
all the corrected traces of one and the same group are added in order to obtain one sum trace per group;
the sum traces of all the groups are juxtaposed as a function of time.

The representation of all these juxtaposed sum traces gives the time-section in multiple coverage.

The curves 18 and 19 in FIG. 2 represent the curvilinear abscissae as a function of the time intervals of the energy peaks of the sum traces of the time-section corresponding to reflections from the interfaces 13 and 15.

The curve 18 has an ascending portion 18a which corresponds to a decrease in distance from the borehole 1 to the interface 13 and a descending portion 18b which corresponds to an increase in distance from the same borehole 1 to the interface 13 when considering a path of travel along the curvilinear abscissa of the horizontal borehole 1. The position of the interface 15 with respect to the horizontal borehole 1 is given by the curve 19 which shows that the horizontal borehole 1 is located in progressively closer proximity to the interface 15 when considering a path of travel along the curvilinear abscissa of said borehole 1.

At the curvilinear abscissa 21' corresponding to the point 21, the borehole 1 extends through the interface 13, which results in a zero time interval for the reflected arrival of the curve 18.

The intersection 22 of the curves 18 and 19 corresponds to that portion of the horizontal borehole 1 which is equidistant from the interfaces 13 and 15.

The conversion of the section of FIG. 2 to a depth-section is performed by means of the average velocities determined at the time of processing operations relating to the refracted and/or reflected waves. In fact, the depth-section has two curves which are similar to the curves 18 and 19 and relatively displaced by a predetermined factor corresponding to the measured velocities $V_1$ and $V_2$. It is for this reason that the depth-section has not been shown and determination of the position of the interfaces 13 and 15 which delimit the zone 4 is carried out on the depth-section rather than the time-section.

It is worthy of note that the method in accordance with the invention makes it possible to overcome the obstacle which is conventionally designated in surface seismology as the depth of penetration which is the depth beyond which the properties of the formations no longer have any significant incidence on measurements or recordings or beyond which reflections cannot be pointed with a reliable degree of safety. In seismic reflection, the depth considered is in fact dependent in particular on the attenuation of the seismic waves within the geological formation or strata, on the wave transmission power but also on the relative power of noises which reduce the signal-to-noise ratio as the amplitude of the transmitted signal decreases. In spite of all the efforts which have been expended in an endeavor to achieve better noise attenuation as well as better frequency filtering at the time of processing, noise signals having different origins still remain (transmission noise and residual noise after processing) and the level of these noise signals increases with depth (and with time).

Since variations in the transmitted signal and in background noise are conducive to a reduction in the signal-to-noise ratio as a function of depth up to a limiting value which is the depth of penetration, it is easy to understand why conventional seismic methods are unsuitable or cannot be employed for horizontal boreholes.

On the contrary, the method in accordance with the invention permits the achievement of an excellent signal-to-noise ratio inasmuch as organized surface noise does not in any way affect the measurement and transmitter noise is highly attenuated since the measuring tool employed operates at frequencies within the range of 5,000 to 10,000 Hz. Furthermore, utilization of these high frequencies achieves an even greater improvement in accuracy of positioning of the limits of the zone 4 with respect to the horizontal borehole. This accuracy is dependent on the wavelength employed which will be of the order of one meter and even less in the case of the frequencies indicated.

In the foregoing, reference was made to a measuring tool which is displaced within the horizontal borehole. Tool displacement can be carried out continuously at a rate of travel of the order of 7 m/min. with recording of shot moments at time intervals of 70 ms. It would also be possible to displace the measuring tool in a noncontinuous manner or in other words to stop the tool at each shot while the length of feed may or may not be varied. In the case of a constant length of tool-feed, the measuring tool can be displaced in such a manner as to ensure that each transmitter is brought to the position which had been occupied by the preceding transmitter. The recordings of the acoustic paths of the refracted waves can also be grouped together in pairs in order to be processed in accordance with one of the methods described in the patents cited earlier. The transmitted waves are produced by pulses emitted at given instants uniformly spaced in time or related to depth levels of the tool within the borehole.

Another way of generating the transmitted acoustic waves would be to emit pulses in accordance with a predetermined random code such as, for example, the codes designated as SOSIE ® and SEISCODE ® and described in French Pat. Nos. FR 1 583 239 and 2 123 839. Recording of the shot moments permits correlation of recordings with the sequence of shot moments.

It is also possible in accordance with another object of the invention to obtain seismic sections in simple coverage by utilizing a single transmitter and a single receiver or in multiple coverage by virtue of the fact that there are four transmitters and twelve receivers and therefore forty-eight available traces. Multiple coverage produces a very appreciable improvement in the measured signal-to-noise ratio. When multiple coverage is employed, there is obtained in addition an evaluation of the average velocity of propagation in a direction which is different from that of the horizontal borehole without any disturbance of measurement by drilling operations and by the fluid which fills the borehole whereas such disturbances would not fail to occur if the measurements were made solely on the strata which immediately surround the horizontal borehole.

A difficulty may arise when a non-continuous horizon is seen on the section, this difficulty being related to identification of the origin of a horizon of this type. In this case, assistance may be obtained from measurements made beforehand by conventional methods. If the distance from the horizon to the horizontal borehole increases when this latter rises to a slight extent, the reason for this is that the horizon is located beneath the borehole. Conversely, the progressive variation in distance to the borehole compared with the profile of said borehole can also be detected on the seismic section. In particular, all the interfaces traversed by the oblique portion of the borehole give rise to reflections at a zero distance from the borehole precisely at the point of intersection with the horizontal borehole. Thus it follows that the interfaces located beneath the horizontal borehole are located by virtue of the fact that their distance to the horizontal borehole as measured on the seismic section decreases when the depth of the measuring tool increases in the oblique portion of the horizontal borehole.

Within strata of relatively small thickness, there may take place a propagation of guided waves or wall waves which can readily be observed by means of the method in accordance with the invention and are capable of supplying valuable data relating to the strata under consideration.

It should finally be noted that the method in accordance with the invention is applicable to cased wellbores in spite of the spurious signals which arise from the casing. In fact, the spurious signals are of the refracted type and thus have no appreciable influence on the processing of reflected waves. Moreover, these signals arrive much earlier than the reflected signals and have a distinctly higher frequency content than these latter, thus facilitating their removal.

In addition to the zoom effect which, as described in the foregoing, is permitted within the productive formation as a result of precise identification of the geometry and constitution of the reflectors both in thickness and in nature, the method in accordance with the invention now permits an approach to heterogeneities on a scale which varies between a few centimeters and a few hundred meters.

What is claimed is:

1. A method of seismic prospecting with very high resolution in horizontal boreholes drilled in a geological medium formed of stratified layers separated by interfaces, wherein the method comprises the steps of:

placing within a substantially horizontal bore a measuring tool having at least three transducers for transmitting and receiving acoustic waves and a length at most equal to the distance between the bore hole and the most distant interface of interest of a zone of the medium;

generating acoustic waves from a least one of the transmitting transducers the wavelength of said acoustic waves being within the range of a few centimeters to a few meters;

at least one of the receiving transducers receiving on the one hand waves refracted from the borehole wall and from the geological strata located in the immediate vicinity of the bore hole and on the other hand waves reflected from geological strata located at a distance from the borehole;

recording the refracted waves and reflected waves in the form of electrical signals;

recording the instants of generation of the transmitted acoustic waves;

processing the recorded signals in order to determine at least the average propagation velocities of the refracted waves and reflected waves respectively;

determining at least one time-section from the signals corresponding to the reflected waves;

converting at least the time-section to a depth-section by means of the average propagation velocities of the reflected waves so as to constitute a depth section from which is determined the position of the interfaces located within the geological zone traversed horizontally by said borehole.

2. A method according to claim 1, wherein the wavelength is within the range of 5 centimeters to 3 meters.

3. A method according to claim 1, wherein the transmitted waves are produced by pulsed signals, the time-duration of each transmission being longer than the listening time.

4. A method according to claim 1, wherein the transmissions are carried out in accordance with a predetermined code and wherein processing of recorded signals includes a step of correlation of reflected signals with the sequence of shot moments.

5. A method according to claim 1, wherein the measuring tool is constituted by four transmitters and twelve receivers, the distance between the transmitters being shorter than the distance between the receivers.

6. A method according to claim 1, wherein the wavelength is within the range of 15 to 75 centimeters.

7. A method according to claim 1, wherein the measuring tool is moved continuously within the borehole.

8. A method according to claim 1, wherein the measuring tool is moved in a noncontinuous manner within the borehole.

9. The method of claim 1 wherein the reflected waves are reflected from geolgoical strata located at a distance not in the immediate vicinity of the borehole.

10. The method of claim 1 wherein the refracted waves are wave refracted from the borehole and from geological strata in an immediate vicinity of the borehole.

* * * * *